(12) United States Patent
Hattori et al.

(10) Patent No.: US 7,385,785 B2
(45) Date of Patent: Jun. 10, 2008

(54) MAGNETIC RECORDING MEDIUM AND MAGNETIC RECORDING AND REPRODUCTION APPARATUS

(75) Inventors: Kazuhiro Hattori, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 457 days.

(21) Appl. No.: 11/220,542

(22) Filed: Sep. 8, 2005

(65) Prior Publication Data

US 2006/0098343 A1    May 11, 2006

(30) Foreign Application Priority Data

Nov. 10, 2004    (JP)  ............... 2004-326477

(51) Int. Cl.
    *G11B 5/82*      (2006.01)
(52) U.S. Cl. ...................................... 360/135
(58) Field of Classification Search ................. 360/135
    See application file for complete search history.

(56) References Cited

U.S. PATENT DOCUMENTS

| | | | |
|---|---|---|---|
| 5,249,175 A * | 9/1993 | Akahira et al. ........... 369/275.1 |
| 6,014,296 A | 1/2000 | Ichihara et al. | |
| 6,077,585 A * | 6/2000 | Aoyama .................... 428/64.4 |
| 6,583,957 B1 | 6/2003 | Takeshita et al. | |
| 6,586,044 B1 | 7/2003 | Takeshita et al. | |
| 2004/0233579 A1* | 11/2004 | Matono ..................... 360/126 |
| 2005/0196650 A1* | 9/2005 | Suwa et al. ................ 428/848 |
| 2005/0219747 A1* | 10/2005 | Hsu et al. .................. 360/126 |
| 2005/0243467 A1* | 11/2005 | Takai et al. ................ 360/135 |
| 2007/0139818 A1* | 6/2007 | Shimazawa et al. ........ 360/126 |
| 2007/0159719 A1* | 7/2007 | Yamakawa et al. ......... 360/126 |

FOREIGN PATENT DOCUMENTS

| | | |
|---|---|---|
| JP | A 07-129953 | 5/1995 |
| JP | A 09-097419 | 4/1997 |
| JP | A 2000-195042 | 7/2000 |
| JP | A-2003-109333 | 4/2003 |
| JP | A-2006-31850 | 2/2006 |

* cited by examiner

*Primary Examiner*—Allen Cao
(74) *Attorney, Agent, or Firm*—Oliff & Berridge, PLC

(57) ABSTRACT

A magnetic recording medium is provided, which includes a recording layer formed in a concavo-convex pattern to achieve high areal density and can ensure good recording and reproduction characteristics so as to provide high reliability. The magnetic recording medium has a substrate and a recording layer formed in the predetermined concavo-convex pattern over the substrate. The recording layer has a non-recording element and recording elements. The non-recording element is formed as convex portion of the concavo-convex pattern at an outer circumferential end and/or an inner circumferential end. The recording elements are formed as convex portions of the concavo-convex pattern in a region other than a region where the non-recording element is arranged. The magnetic recording medium further has a non-magnetic material with which concave portions of the concavo-convex pattern are filled and which covers the non-recording element, and a protective layer formed over the recording layer and the non-magnetic material.

20 Claims, 4 Drawing Sheets

MAGNETIC RECORDING MEDIUM AND MAGNETIC RECORDING AND REPRODUCTION APPARATUS

BACKGROUND OF THE INVENTION

1. Field of the Invention

The present invention relates to a magnetic recording medium including a recording layer formed in a concavo-convex pattern, and a magnetic recording and reproduction apparatus.

2. Description of the Related Art

Conventionally, in a magnetic recording medium such as a hard disk, a non-magnetic protective layer is formed over a recording layer in order to protect the recording layer against abrasion caused by contact with a magnetic head and corrosion caused by oxygen and the like in an atmosphere. A lubricating layer is further formed on the protective layer. The protective layer can be formed by a vapor deposition method such as CVD (chemical vapor deposition). The lubricating layer can be formed by dipping or the like.

On the other hand, in the magnetic recording medium, various types of development such as miniaturization of magnetic particles forming the recording layer, change of a material for the magnetic particles, and miniaturization of head processing have been made to largely improve areal density of the recording layer. The improvement of the areal density is expected to continue. However, problems of the limitation of the magnetic head processing, erroneous recording of information onto a track adjacent to a target track caused by broadening of a magnetic field of the recording head, crosstalk during reproduction, and other problems have been made apparent. Therefore, the improvement of the areal density by the conventional development approach has reached the limit. Thus, a magnetic recording medium in which a recording layer is formed in a predetermined concavo-convex pattern, such as a discrete track medium and a patterned medium, has been proposed as a candidate of a magnetic recording medium that can further improve the areal density (see Japanese Patent Laid-Open Publication No. Hei 7-129953, for example).

In the discrete track medium and the patterned medium, it is desirable to fill concave portions of the concavo-convex pattern with a non-magnetic material so as to flatten a surface of the medium from a viewpoint of stable flying of the magnetic head (see Japanese Patent Laid-Open No. 2000-195042, for example). Moreover, it is also preferable in the discrete track medium and the patterned medium to form a protective layer and a lubricating layer over the recording layer in order to protect the recording layer against abrasion caused by contact with the magnetic head and corrosion caused by contact with oxygen and the like in the atmosphere.

However, when the protective layer is formed by CVD or the like, an object to be processed in a shape of a circular disk is held by jigs or the like at several portions, e.g., three portions at an outer circumferential end or an inner circumferential end. Thus, particles forming the protective layer are not sufficiently supplied to a region around the portion held by the jigs. Therefore, the thickness of the protective layer in that region becomes insufficient or no protective layer is formed in that region. Since the outer circumferential end and the inner circumferential end of the magnetic recording medium are usually non-recording regions, corrosion of the recording layer in the region in which the thickness of the protective layer is not enough does not directly cause a problem in recording and reproduction. However, the corrosion of the recording layer may progress from the region in which the thickness of the protective layer is not enough to other regions so as to degrade the recording and reproduction characteristics. Thus, there is a reliability problem.

On the other hand, the protective layer can be deposited on the entire surface of the object to be processed by forming the protective layer to some degree, removing the object to be processed from the jigs, holding the object to be processed again at other portions by the jigs, and further depositing the protective layer. However, the reliability problem remains in this case because the protective layer is thinner around the portions held by the jigs. Moreover, a method is considered which forms the protective layer to be thick on the entire surface of the object to be processed including a recording region in such a manner that the protective layer having a sufficient thickness is surely formed at and around the portions held by the jigs. However, in case of a magnetic recording medium such as a discrete track medium and a patterned medium, for which areal density of 200 Gbpsi or more is expected, a guideline that a magnetic gap between an upper surface of the recording layer and a magnetic head is set to 15 nm or less is issued. Thus, when the protective layer is formed to be excessively thick even by several nanometers, the magnetic gap becomes too large. This may degrade the recording and reproduction characteristics.

Alternatively, as described in Japanese Patent Laid-Open Publication No. 2000-195042, the non-magnetic material with which the concave portions are filled may also be formed on the convex portions and the protective layer may be formed on the non-magnetic material. In this case, the magnetic gap also becomes too large as in the case where the protective layer is formed to be excessively thick, when the non-magnetic material is formed in sufficient thickness at and around the portions held by the jigs. Thus, the recording and reproduction characteristics may be also degraded in this case.

SUMMARY OF THE INVENTION

In view of the foregoing problems, various exemplary embodiments of this invention provide a magnetic recording medium that includes a recording layer formed in a concavo-convex pattern to achieve high areal density and can ensure good recording and reproduction characteristics to achieve high reliability, and a magnetic recording and reproduction apparatus including such a magnetic recording medium.

Various exemplary embodiments of the present invention achieves the above object by covering non-recording element of a recording layer with a non-magnetic material with which concave portions of a concavo-convex pattern of the recording layer are filled.

In this case, the non-recording element can be completely covered with at least one of the non-magnetic material or a protective layer. Thus, even if the protective layer having an insufficient thickness is formed above a non-recording element, for example, the non-recording element is covered with the non-magnetic material and is therefore protected against oxygen and the like in the atmosphere that cause corrosion. Although a magnetic gap between the recording layer and a magnetic head can increase above the non-recording element by the amount corresponding to the thickness of the non-magnetic material, as compared with that above the recording elements, the increase of the magnetic gap does not matter from a practical viewpoint. This is because recording and reproduction of data are not performed for the non-recording element. On the other hand, the magnetic gap between the recording elements and the magnetic head does not increase. Therefore, good recording and reproduction characteristics can be obtained.

Accordingly, various exemplary embodiments of the invention provide a magnetic recording medium comprising:

a substrate having a central hole;

a recording layer formed in a predetermined concavo-convex pattern over the substrate, the recording layer having a non-recording element and recording elements, the non-recording element being formed as convex portion of the concavo-convex pattern at at least one of an outer circumferential end and an inner circumferential end, the recording elements being formed as convex portions of the concavo-convex pattern in a region other than a region where the non-recording element is arranged;

a non-magnetic material with which concave portions of the concavo-convex pattern of the recording layer are filled, the non-magnetic material covering the non-recording element; and a protective layer formed over the recording layer and the non-magnetic material.

Alternatively, various exemplary embodiments of the invention provide a magnetic recording medium comprising:

a substrate;

a recording layer formed in a predetermined concavo-convex pattern over the substrate, the recording layer having a non-recording element and recording elements, the non-recording element being formed as a convex portion of the concavo-convex pattern at at least one of an outer circumferential end and a center, the recording elements being formed as convex portions of the concavo-convex pattern in a region other than a region where the non-recording element is arranged;

a non-magnetic material with which concave portions of the concavo-convex pattern of the recording layer are filled, the non-magnetic material covering the non-recording element; and a protective layer formed over the recording layer and the non-magnetic material.

In the present application, The "recording layer formed in a predetermined concavo-convex pattern over a substrate" shall refer to a recording layer obtained by dividing a continuous recording layer into a number of recording elements and a non-recording element in the predetermined pattern, a recording layer obtained by partially dividing the continuous recording layer into recording elements which are partly continuous and a non-recording element in the predetermined pattern, a recording layer continuously formed on a part of the substrate, such as a spiral recording layer, and a continuous recording layer in which both a convex portion and a concave portion are formed.

In the present application, the "non-recording element formed as convex portion at an outer circumferential end" shall refer to convex portion of the recording layer formed at closest position to an outer circumference of the substrate. That is, the closest position of the recording layer to the outer circumference of the substrate is regarded as the outer circumferential end of the recording layer. The outer circumference of the recording layer may not be necessarily coincident with the outer circumference of the substrate. This is the same for the "non-recording element formed as convex portion at an inner circumferential end."

The term "magnetic recording medium" in the present application shall refer not only to a medium that uses only magnetism for recording and reading information, such as a hard disk, a floppy (registered trademark) disk, and a magnetic tape, but also to a magneto-optical recording medium that uses magnetism and light together, such as MO (Magneto Optical), and a heat assisted magnetic recording medium that uses magnetism and heat together.

DETAILED DESCRIPTION OF THE PREFERRED EMBODIMENTS

Preferred exemplary embodiments of the present invention will be described in detail, with reference to the drawings.

Figure 1:
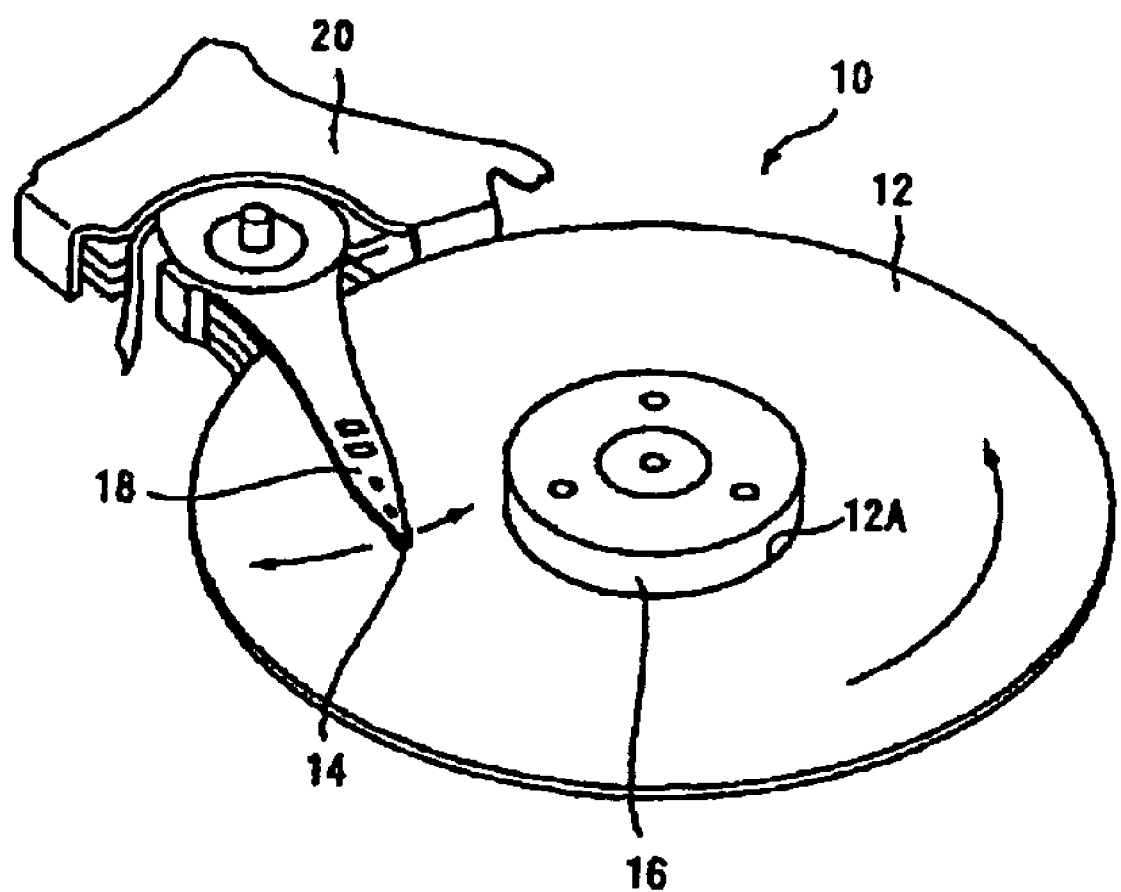
FIG. 1 is a perspective view schematically showing a structure of a main part of a magnetic recording and reproduction apparatus according to a first exemplary embodiment of the present invention.

As shown in FIG. 1, a magnetic recording and reproduction apparatus 10 according to a first exemplary embodiment of the present invention includes a magnetic recording medium 12 and a magnetic head 14 for performing recording and reproduction of data for the magnetic recording medium 12. The magnetic recording and reproduction apparatus 10 has a feature in a structure of the magnetic recording medium 12. The detailed description of the other structure is appropriately omitted because it is not considered as being necessary for understanding of this first exemplary embodiment.

The magnetic recording medium 12 has a central hole 12A. The magnetic recording medium 12 is fixed to a chuck 16 at its central hole 12A so as to be rotatable together with the chuck 16. The magnetic head 14 is attached to a tip end of an arm 18. The arm 18 is attached to a base 20 so as to be rotatable. Thus, the magnetic head 14 can be moved on a circular arc path along a radial direction of the magnetic recording medium 12 so as to be close to a surface of the magnetic recording medium 12.

Figure 2:
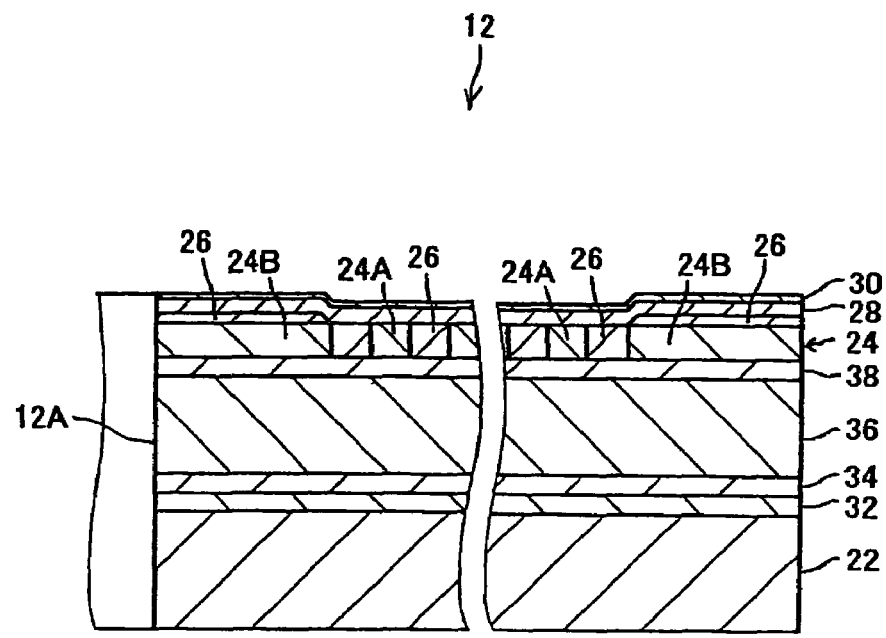
FIG. 2 is a cross-sectional side view schematically showing a structure of a magnetic recording medium of the magnetic recording and reproduction apparatus.

The magnetic recording medium 12 is a perpendicular recording type discrete track medium. As shown in FIG. 2, the magnetic recording medium 12 includes: a substrate 22 in a shape of a circular disk having a central hole; a recording layer 24 that is formed in a predetermined concavo-convex pattern over the substrate 22 and includes recording elements 24A and non-recording elements 24B; a non-magnetic material 26 with which concave portions of the concavo-convex pattern of the recording layer 24 are filled, the non-magnetic material 26 covering the non-recording elements 24B; and a protective layer 28 formed over the recording layer 24 and the non-magnetic material 26. The non-recording elements 24B are formed as convex portions at an outer circumferential end and an inner circumferential end of the recording layer 24, and the recording elements 24A are formed as convex portions in a region of the recording layer 24 other than a region where the non-recording elements 24B are arranged.

The magnetic recording medium 12 is sectioned into data regions and servo regions (not shown). The data regions and the servo regions are alternately arranged in a circumferential direction of the magnetic recording medium 12 (circumferential direction of a data track).

The recording layer 24 has a thickness of 5 to 30 nm. CoCr alloys such as a CoCrPt alloy, FePt alloys, a multilayer structure of those alloys, oxides such as $SiO_2$ with ferromagnetic particles such as CoPt particles contained therein in a form of a matrix can be used as a material for the recording layer 24.

The recording elements 24A are formed in a pattern of concentric tracks at small intervals in the radial direction in the data region. FIG. 2 is a cross-sectional side view taken along the radial direction, which shows the recording elements 24A in the data region. The recording elements 24A are formed in a pattern of predetermined servo information in the servo region, although they are not shown.

The non-recording element 24B at the outer circumferential end has an annular shape along the outer circumference of the substrate 22 and has a width of 10 to 500 μm in the radial direction. On the other hand, the non-recording element 24B at the inner circumferential end has an annular shape along the central hole 12A of the substrate 22 and has a width of 100 to 1500 μm in the radial direction. The width in the radial direction of the upper surface (the narrowest width) of the non-recording elements 24B is wider than that of the recording elements 24A.

The substrate 22 can be formed from glass, an Al alloy covered with NiP, or a non-magnetic material such as Si or $Al_2O_3$.

As the non-magnetic material 26, oxides such as $SiO_2$, $Al_2O_3$, $TiO_2$, and a ferrite, nitrides such as AlN, and carbides such as SiC can be used.

The protective layer 28 has a thickness of 1 to 5 nm and is in contact with the recording elements 24A. As a material for the protective layer 28, hard carbon called as diamond like carbon can be used, for example. In the present application, the term "diamond like carbon (hereinafter, simply referred to as "DLC")" shall mean a material that mainly contains carbon and has an amorphous structure and Vickers hardness of about $2\times10^9$ to about $8\times10^{10}$ Pa.

A lubricating layer 30 is formed on the protective layer 28. The lubricating layer 30 has a thickness of 1 to 2 nm. As a material for the lubricating layer 30, fluorine containing lubricant such as PFPE (perfluoro-polyether) can be used.

An underlayer 32, an antiferromagnetic layer 34, a soft magnetic layer 36, and a seed layer 38 are formed between the substrate 22 and the recording layer 24 in that order from the substrate 22 side. The underlayer 32 has a thickness of 2 to 40 nm and can be formed of Ta, or the like. The antiferromagnetic layer 34 has a thickness of 5 to 50 nm and can be formed of a PtMn alloy, a RuMn alloy, or the like.

The soft magnetic layer 36 has a thickness of 50 to 300 nm and can be formed of a Fe (iron) alloy, a Co (cobalt) amorphous alloy, or a ferrite, or the like.

The soft magnetic layer 36 may have a multilayer structure including a layer having soft magnetism and a non-magnetic layer. The seed layer 38 has a thickness of 2 to 40 nm. As a specific material for the seed layer 38, non-magnetic CoCr alloys, Ti, Ru, a multilayer structure of Ru and Ta, and MgO can be used, for example.

Next, an operation of the magnetic recording medium 12 is described.

Figure 3:
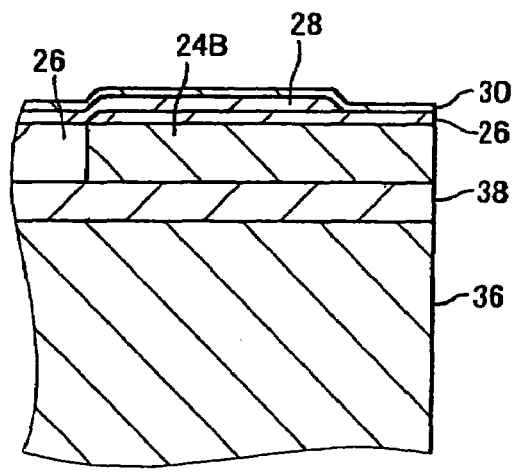
FIG. 3 is an enlarged cross-sectional side view schematically showing the structure of the magnetic recording medium around an outer circumference thereof.

The non-recording elements 24B are covered with the non-magnetic material 26 in the magnetic recording medium 12. Thus, even if there is a portion of the protective layer 28 that has an insufficient thickness above the non-recording element 24B, as shown in FIG. 3, for example, the non-recording element 24B below that portion of the protective layer 28 is protected by the non-magnetic material 26 against oxygen and the like in the atmosphere that cause corrosion. Moreover, the non-magnetic material 26 is chemically stable because it is any of oxides, nitrides, and carbides, and the like. That is, the non-magnetic material 26 does not corrode even when coming into contact with oxygen and the like in the atmosphere. Although a magnetic gap between the recording layer 24 and the magnetic head 14 increases above the non-recording elements 24B by the amount corresponding to the thickness of the non-magnetic material 26 as compared with that above the recording elements 24A, the increase of the magnetic gap does not matter because recording and reproduction of data are not performed for the non-recording elements 24B. In addition, the protective layer 28 is in contact with the recording elements 24A and the magnetic gap between the recording element 24A and the magnetic head 14 does not become larger. Thus, good recording and reproduction characteristics can be obtained.

The narrowest width of the upper surface of the non-recording elements 24B is wider than that of the recording elements 24A. Thus, peeling and fall of the non-magnetic material 26 formed on the non-recording elements 24B hardly occur.

Since the concave portions of the concavo-convex pattern of the recording layer 24 are filled with the non-magnetic material 26 and the degree of concavo-convex on the surface of the magnetic recording medium 12 is small, therefore the flying height of the magnetic head 14 is stable. Also with regard to this point, good recording and reproduction characteristics can be obtained.

The recording elements 24A are formed in a pattern of tracks in the data region of the magnetic recording medium 12. Thus, problems of erroneous recording of information onto a track adjacent to a target track, crosstalk during reproduction, and the like hardly occur.

Furthermore, the recording elements 24A are separated from each other and no recording layer 24 exists in the concave portions between the recording elements 24A. Thus, no noise is generated from the concave portions. Also with regard to this point, good recording and reproduction characteristics can be obtained.

A method for manufacturing the magnetic recording medium 12 is briefly now described. First, the underlayer 32, the antiferromagnetic layer 34, the soft magnetic layer 36, the seed layer 38, a continuous recording layer (unprocessed recording layer 24), a first mask layer, and a second mask layer are formed over the substrate 22 in that order by sputtering. Then, a resist layer is applied by spin coating. C (carbon) can be used as a material for the first mask layer, and Ni (nickel) can be used as a material for the second mask layer, for example.

Next, a concavo-convex pattern is transferred onto the resist layer by nano-imprinting. Then, the resist layer under the bottom of the concave portions is removed by reactive ion etching using $O_2$ gas as reactive gas, the second mask layer under the bottom of the concave portions is removed by ion beam etching using Ar gas as process gas, and the first mask layer under the bottom of the concave portions- is removed by reactive ion etching using $O_2$ gas as reactive gas.

Then, the continuous recording layer under the bottom of the concave portions is removed in the thickness direction by ion beam etching using Ar gas as process gas, thereby forming the recording layer 24 that is divided into the recording elements 24A and the non-recording elements 24B.

Subsequently, the non-magnetic material 26 is deposited on a surface of an object to be processed, thereby filling the concave portions of the concavo-convex pattern of the recording layer 24 with the non-magnetic material 26. The non-magnetic material 26 is deposited in concavo-convex pattern following the concavo-convex pattern of the recording layer 24. Convex portions of the non-magnetic material 26 formed on the non-recording elements 24B are wider than that formed on the recording elements 24A.

Then, while the object to be processed is rotated, an excess part of the non-magnetic material 26 over the recording elements 24A is removed by ion beam etching using Ar gas as process gas that is irradiated at an oblique angle. In this manner, the surface of the object to be processed is flattened. Dry etching such as ion beam etching has a larger etching rate for the convex portion than for the concave portion, and has a larger etching rate for the convex portion having a larger area than for the convex portion having a smaller area. Thus, even if the excess part of the non-magnetic material 26 over the recording elements 24A is removed and the surface of the object to be processed is flattened in a region in which the recoding elements 24A are arranged, the non-magnetic material 26 remains on the non-recording elements 24B.

Then, the protective layer 28 is deposited by CVD and the lubricating layer 30 is applied by dipping over the surface of the object to be processed. Thus, the aforementioned magnetic recording medium 12 is obtained.

Next, a second exemplary embodiment of the present invention will be described.

Figure 4:
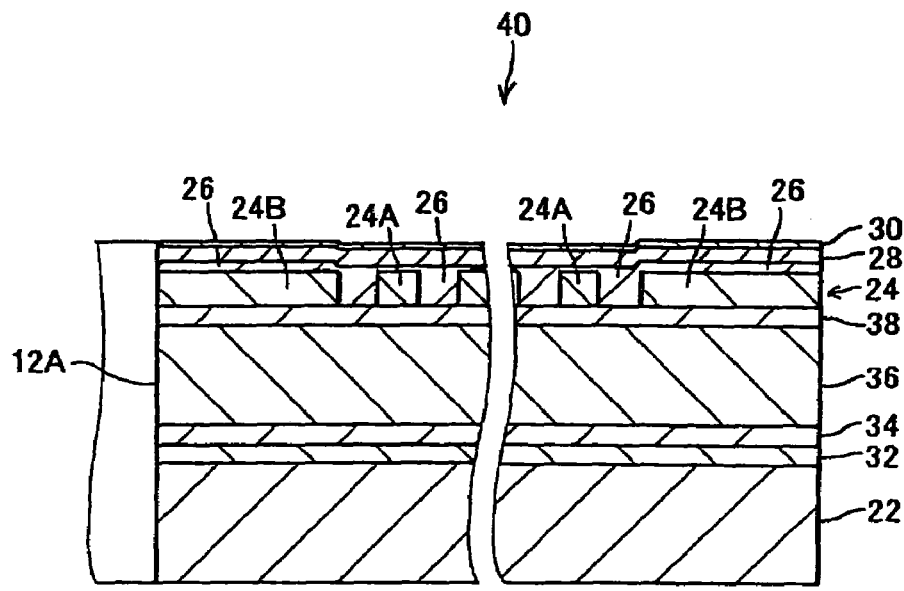
FIG. 4 is a cross-sectional side view schematically showing a structure of a magnetic recording medium according to a second exemplary embodiment of the present invention.

In the magnetic recording medium 12 of the first exemplary embodiment, the protective layer 28 is in contact with the recording elements 24A. On the other hand, a magnetic recording medium 40 of the second exemplary embodiment has a feature that the non-magnetic material 26 is provided over the entire surface of the recording layer 24 so as to be thicker over the non-recording elements 24B than over the recording elements 24A, as shown in FIG. 4. Except for the above, the structure of the magnetic recording medium 40 is the same as the above magnetic recording medium 12. Therefore, the same components in the magnetic recording medium 40 as those in the magnetic recording medium 12 are labeled with the same reference numerals as those in FIGS. 2 and 3 and the description thereof is omitted.

It is not easy to flatten the upper surface of the non-magnetic material 26 with which the concave portions between the recording elements 24A are filled and the upper surface of the recording elements 24A in such a manner that both the upper surfaces are coincident with each other. Thus, even if the protective layer 28 and the lubricating layer 30 are formed over the non-magnetic material 26 and the recording elements 24A, the surface of the lubricating layer 30 can easily have a concavo-convex shape in which the concavo-convex pattern of the recording layer 24 is reflected to some degree.

On the other hand, in the case where the non-magnetic material 26 is provided over entire surface of the recording layer as in the magnetic recording medium 40, it is easy to flatten the upper surface of the non-magnetic material and therefore the surface of the resultant magnetic recording medium can be easily flattened. Thus, stable flying property of the magnetic head 14 can be ensured.

Figure 5:
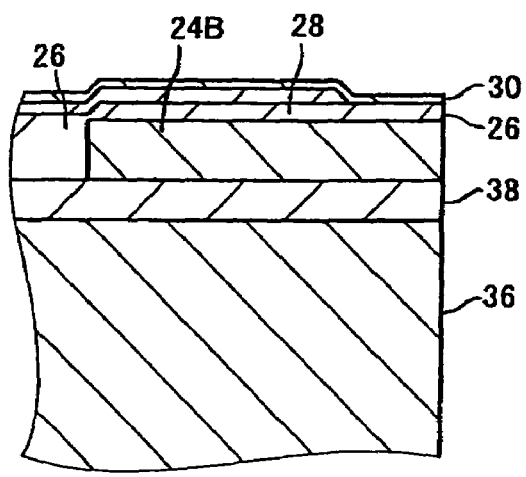
FIG. 5 is an enlarged cross-sectional side view schematically showing the structure of the magnetic recording medium around an outer circumference thereof.

In addition, the non-magnetic material 26 is formed to be thicker over the non-recording elements 24B than over the recording elements 24A. Thus, in the case where there is a portion of the protective layer 28 having an insufficient thickness over the non-recording element 24B, as shown in FIG. 5, for example, an effect of protecting the non-recording element 24B below that portion against oxygen and the like in the atmosphere that cause corrosion is high. Moreover, the magnetic gap between the recording layer 24 and the magnetic head 14 is larger above the non-recording elements 24B than above the recording elements 24A by the amount corresponding to a thickness difference of the non-magnetic material 26. However, this does not matter because recording and reproduction of data are not performed for the non-recording elements 24B.

Incidentally, the non-magnetic material 26 is also provided over the recording elements 24A in the magnetic recording medium 40. However, the non-magnetic material 26 over the recording elements 24A does not supplement the protection effect of the protective layer 28 over the recording elements 24A. Thus, the non-magnetic material 26 over the recording elements 24A may be thin. Therefore, a total thickness of the non-magnetic material 26 and the protective layer 28 can be made approximately the same as the protective layer 28 in the aforementioned magnetic recording medium 12 of the first exemplary embodiment. Due to this, the magnetic gap that is approximately the same as that in the aforementioned magnetic recording medium 12 can be achieved in the magnetic recording medium 40 of the second exemplary embodiment, thus providing good recording and reproduction characteristics as in the aforementioned magnetic recording medium 12.

Next, a third exemplary embodiment of the present invention is described.

Figure 6:
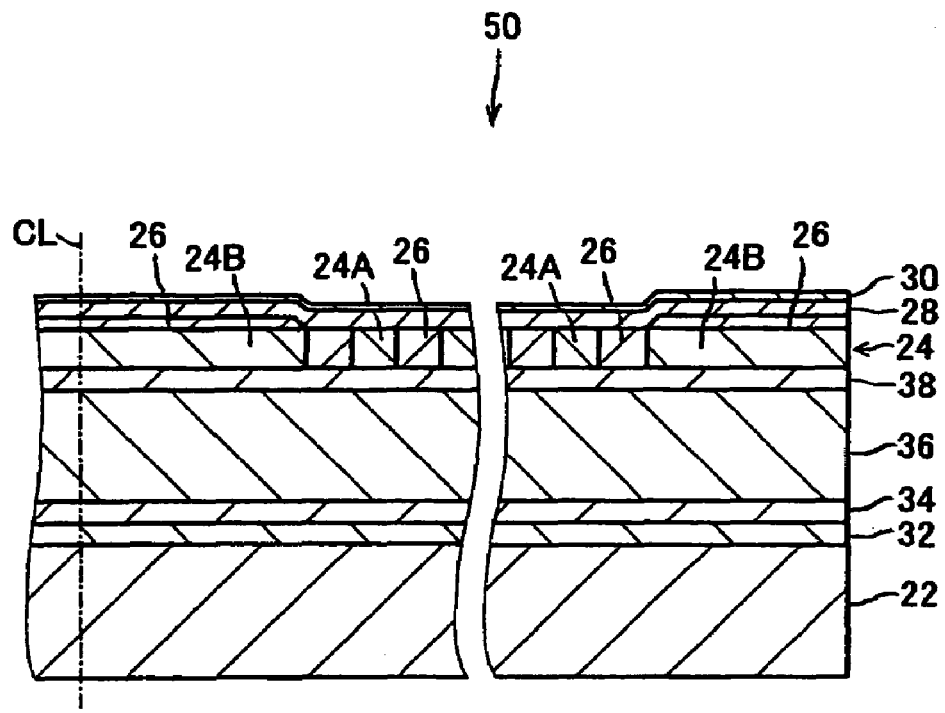
FIG. 6 is a cross-sectional side view schematically showing a structure of a magnetic recording medium according to a third exemplary embodiment of the present invention.

A magnetic recording medium 50 of the third exemplary embodiment is different in its shape from the magnetic recording medium 12 of the first exemplary embodiment that has the central hole 12A. More specifically, the magnetic recording medium 50 has a shape of a circular disk having no central hole. The non-recording element 24B in a shape of a circular disk is formed at the center of the magnetic recording medium 50. The non-recording element 24B at the center has a diameter of 200 to 3000 μm. Except for the above, the structure of the magnetic recording medium 50 of the third exemplary embodiment is the same as that of the aforementioned magnetic recording medium 12 of the first exemplary embodiment. Thus, components of the magnetic recording medium 50 that are the same as those of the magnetic recording medium 12 are labeled with the same reference numerals as those in FIGS. 2 and 3 and the detailed description thereof is omitted. Please note that CL in FIGS. 6 and 7 represents a central axial line of the magnetic recording medium 50.

As described above, the non-magnetic material 26 is formed to cover the non-recording elements 24B also in the magnetic recording medium 50 having no central hole. Thus, even if there is a portion of the protective layer 28 having an insufficient thickness over the non-recording elements 24B, the non-recording elements 24B below that portion can be protected by the non-magnetic material 26 against oxygen and the like in the atmosphere that cause corrosion.

Figure 7:
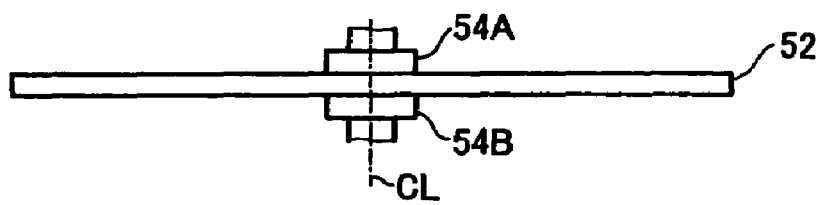
FIG. 7 is a cross-sectional side view schematically showing an exemplary holding technique in a manufacturing process of the magnetic recording medium.

When the magnetic recording medium having no central hole is manufactured, the protective layer 28 may be formed while an object to be processed 52 is pinched and held at a center by a pair of jigs 54A and 54B on both sides, as shown in FIG. 7. In this case, no protective layer 28 is formed on portion of the non-recording element 24B around the center of the object to be processed 52 that is in contact with the jigs 54A and 54B. Thus, to provide the non-magnetic material 26 over the non-recording element 24B arranged at the center has an advantage that the non-recording element 24B under the portion that is in contact with the jigs 54A and 54B can be protected by the non-magnetic material 26 against oxygen and the like in the atmosphere that cause corrosion.

Moreover, when being incorporated into a magnetic recording and reproduction apparatus, the magnetic recording medium having no central hole may be fixed at its center to a rotation shaft or the like of the magnetic recording and reproduction apparatus and the like with adhesive or the like. Thus, when the non-magnetic material 26 is provided over the non-recording element 24B at the center, an effect of reinforcing a portion that is fixed with the adhesive or the like and suppressing generation and progress of corrosion of the recording layer 24 caused by crack in that portion fixed with the adhesive or the like can be also expected.

In the first and third exemplary embodiments, not only the non-recording element 24B at the outer circumferential end but also the non-recording element 24B at the inner circumferential end (or the center) is covered with the non-magnetic material 26. However, in the case where the object to be processed is held by jigs or the like only at one of the outer circumferential end and the inner circumferential end (or the center) in a process for forming the protective layer 28, only the non-recording element 24B at the end (or the center) held by the jigs maybe covered with the non-magnetic material 26.

In the second exemplary embodiment, the non-magnetic material 26 is formed to be thicker over the non-recording elements 24B at both the outer circumferential end and the inner circumferential end than over the recording elements 24A. However, in the case where the object to be processed is held by jigs or the like only at one of the outer circumferential end and the inner circumferential end in the process for forming the protective layer 28, the non-magnetic material 26 may be formed to be thicker only over the non-recording element 24B at the end held by the jigs or the like than over the recording elements 24A.

In the above first to third exemplary embodiments, the underlayer 32, the antiferromagnetic layer 34, the soft magnetic layer 36, and the seed layer 38 are formed between the substrate 22 and the recording layer 24. However, the structure between the substrate 22 and the recording layer 24 can be changed in an appropriate manner in accordance with a type or needs of a magnetic recording medium. For example, the underlayer 32 and the antiferromagnetic layer 34 may be omitted so that the soft magnetic layer 36 is formed directly on the substrate 22. Moreover, the seed layer 38 may be omitted so that the recording layer 24 is formed directly on the soft magnetic layer 36.

In the above first to third exemplary embodiments, the magnetic recording media 12, 40, and 50 are perpendicular recording type magnetic recording media. Alternatively, the present invention can be applied to a longitudinal recording type magnetic recording medium.

In the above first to third exemplary embodiments, the recording layer 24 and other layers are formed on one side of the substrate 22 in each of the magnetic recording media 12, 40, and 50. Alternatively, the present invention can be applied to a double-sided magnetic recording medium in which a recording layer and other layers are formed on both sides of the substrate.

In the above first to third exemplary embodiments, the magnetic recording media 12, 40, and 50 are discrete track type magnetic disks in which the recording elements 24A are arranged at small intervals in the radial direction of the track in the data region. Alternatively, the present invention can be applied to a magnetic disk in which the recording elements are arranged at small intervals in the circumferential direction of the track (i.e., a sector direction), a magnetic disk in which the recording elements are arranged at small intervals in both the radial direction and the circumferential direction of the track, and a magnetic disk in which the track is spirally formed. Moreover, the present invention can be also applied to a magneto optical disc such as MO, a heat assisted magnetic disk that uses magnetism and heat together, and other magnetic recording media each of which includes a recording layer formed in a concavo-convex pattern and has a shape other than a circular disk.

What is claimed is:

1. A magnetic recording medium comprising:
   a substrate having a central hole;
   a recording layer formed in a predetermined concavo-convex pattern over the substrate, the recording layer having a non-recording element and recording elements, the non-recording element being formed as convex portion of the concavo-convex pattern at at least one of an outer circumferential end and an inner circumferential end, the recording elements being formed as convex portions of the concavo-convex pattern in a region other than a region where the non-recording element is arranged;
   a non-magnetic material with which concave portions of the concavo-convex pattern of the recording layer are filled, the non-magnetic material covering the non-recording element; and
   a protective layer formed over the recording layer and the non-magnetic material.

2. The magnetic recording medium according to claim 1, wherein
   the protective layer is in contact with the recording elements.

3. The magnetic recording medium according to claim 1, wherein
   the non-magnetic material is provided over an entire surface of the recording layer and is formed to be thicker over the non-recording element than over the recording elements.

4. The magnetic recording medium according to claim 1, wherein
   the non-magnetic material is any of oxides, nitrides, and carbides.

5. The magnetic recording medium according to claim 1, wherein
   a narrowest width of an upper surface of the non-recording element is wider than that of an upper surface of the recording elements.

6. A magnetic recording and reproduction apparatus comprising a magnetic recording medium according to claim 1 and a magnetic head for performing recording and reproduction of data for the magnetic recording medium.

7. The magnetic recording medium according to claim 2, wherein
the non-magnetic material is any of oxides, nitrides, and carbides.

8. The magnetic recording medium according to claim 2, wherein
a narrowest width of an upper surface of the non-recording element is wider than that of an upper surface of the recording elements.

9. A magnetic recording and reproduction apparatus comprising a magnetic recording medium according to claim 2 and a magnetic head for performing recording and reproduction of data for the magnetic recording medium.

10. The magnetic recording medium according to claim 3, wherein
the non-magnetic material is any of oxides, nitrides, and carbides.

11. The magnetic recording medium according to claim 3, wherein
a narrowest width of an upper surface of the non-recording element is wider than that of an upper surface of the recording elements.

12. A magnetic recording and reproduction apparatus comprising a magnetic recording medium according to claim 3 and a magnetic head for performing recording and reproduction of data for the magnetic recording medium.

13. The magnetic recording medium according to claim 4, wherein
a narrowest width of an upper surface of the non-recording element is wider than that of an upper surface of the recording elements.

14. A magnetic recording and reproduction apparatus comprising a magnetic recording medium according to claim 4 and a magnetic head for performing recording and reproduction of data for the magnetic recording medium.

15. A magnetic recording medium comprising:
a substrate;
a recording layer formed in a predetermined concavo-convex pattern over the substrate, the recording layer having a non-recording element and recording elements, the non-recording element being formed as a convex portion of the concavo-convex pattern at at least one of an outer circumferential end and a center, the recording elements being formed as convex portions of the concavo-convex pattern in a region other than a region where the non-recording element is arranged;
a non-magnetic material with which concave portions of the concavo-convex pattern of the recording layer are filled, the non-magnetic material covering the non-recording element; and
a protective layer formed over the recording layer and the non-magnetic material.

16. The magnetic recording medium according to claim 15, wherein
the protective layer is in contact with the recording elements.

17. The magnetic recording medium according to claim 15, wherein
the non-magnetic material is provided over an entire surface of the recording layer and is formed to be thicker over the non-recording element than over the recording elements.

18. The magnetic recording medium according to claim 15, wherein
the non-magnetic material is any of oxides, nitrides, and carbides.

19. The magnetic recording medium according to claim 15, wherein
a narrowest width of an upper surface of the non-recording element is wider than that of an upper surface of the recording elements.

20. A magnetic recording and reproduction apparatus comprising a magnetic recording medium according to claim 15 and a magnetic head for performing recording and reproduction of data for the magnetic recording medium.

* * * * *